(12) United States Patent
Ferderer

(10) Patent No.: US 12,249,797 B2
(45) Date of Patent: Mar. 11, 2025

(54) HIGH-POWER PLUG CONNECTION SYSTEM

(71) Applicant: HARTING Electric Stiftung & Co. KG, Espelkamp (DE)

(72) Inventor: Albert Ferderer, Espelkamp (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 318 days.

(21) Appl. No.: 17/909,380

(22) PCT Filed: Mar. 25, 2021

(86) PCT No.: PCT/DE2021/100296
§ 371 (c)(1),
(2) Date: Sep. 4, 2022

(87) PCT Pub. No.: WO2021/190707
PCT Pub. Date: Sep. 30, 2021

(65) Prior Publication Data
US 2023/0096306 A1    Mar. 30, 2023

(30) Foreign Application Priority Data
Mar. 27, 2020 (DE) ............. 10 2020 108 457.9

(51) Int. Cl.
| | |
|---|---|
| H01R 25/00 | (2006.01) |
| H01R 13/53 | (2006.01) |
| H01R 31/02 | (2006.01) |
| H02G 15/16 | (2006.01) |

(52) U.S. Cl.
CPC ............. *H01R 25/00* (2013.01); *H01R 13/53* (2013.01); *H01R 31/02* (2013.01); *H02G 15/16* (2013.01); *H01R 2201/26* (2013.01)

(58) Field of Classification Search
CPC .... H01R 13/53; H01R 13/6485; H01R 25/00; H01R 31/02; H02G 15/16
USPC .................................................. 439/181, 284
See application file for complete search history.

(56) References Cited

U.S. PATENT DOCUMENTS

| | | | |
|---|---|---|---|
| 3,845,458 A | 10/1974 | Himi | |
| 4,799,895 A * | 1/1989 | Borgstrom ............. | H01R 13/53 439/805 |
| 4,865,559 A * | 9/1989 | Clabburn ............... | H01R 13/53 439/724 |

(Continued)

FOREIGN PATENT DOCUMENTS

DE            4135391 C1    12/1992

*Primary Examiner* — Gary F Paumen
(74) *Attorney, Agent, or Firm* — Smartpat PLC

(57) ABSTRACT

A high-power plug connection system comprises a cable connection housing for connecting at least two electric high-power plug connectors in order to transmit and/or distribute high current strengths and at least two insulating bodies for receiving a respective high-power contact and at least one electrically conductive rail. Longitudinal axes of the high-power contacts are generally arranged on one plane in an offset manner from each other, and the high-power contacts are connected together in an electrically conductive manner by means of an electrically conductive rail, said at least two high-power contacts being provided with a recess into which the electrically conductive rail is at least partly inserted.

10 Claims, 3 Drawing Sheets

(56) References Cited

U.S. PATENT DOCUMENTS

| | | | |
|---|---|---|---|
| 8,388,381 B2* | 3/2013 | Borgstrom | H01R 13/5216 |
| | | | 439/626 |
| 2012/0018217 A1 | 1/2012 | Siebens et al. | |
| 2012/0021650 A1 | 1/2012 | Borgstrom et al. | |

* cited by examiner

HIGH-POWER PLUG CONNECTION SYSTEM

TECHNICAL FIELD

The disclosure relates to a high-power plug connection system. High-power plug connection systems are required to transmit and/or distribute high electrical voltages and high electrical currents. Attention is particularly focused on applicability in underfloor areas of rail vehicles, in particular the connection of power cars and self-propelled railcars to one another.

BACKGROUND

Solutions are known in the prior art which enable the transmission and/or distribution of high electrical currents and/or voltage between vehicles or between vehicles with modules coupled to them. However, these solutions mostly provide disadvantageous and partially undetachable fixing of the corresponding contact elements.

Particular disadvantages of the prior art are the inconvenient maintenance, the rigid design of the system, and generally also a high space requirement. However, especially in the case of highly stressed contact elements, such as for example in the field of rail transportation, there is a growing need for repair and maintenance, for example, owing to increased electrical erosion caused by the high current strengths of over 500 A.

In the priority application for the present application, a search by the German Patent and Trademark Office yielded the following prior art: DE 41 35 391 C1.

SUMMARY

The disclosure provides a space-saving, secure, and cost-effective cable connection housing, in particular suited for use underneath the floors of rail vehicles, for the transmission and/or distribution of high electric currents.

A high-power plug connection system has a cable connection housing for connecting at least two electrical high-power plug connectors for the purpose of transmitting and/or distributing high electrical current strengths. The high-power plug connectors are here designed in particular for current strengths of 80 amperes, preferably current strengths over 500 amperes, specifically current strengths in the region of 1000 amperes. It is thus in particular ensured that use is possible in the field of rail vehicles, in particular in the underfloor area of railcars, power cars, and self-propelled railcars. The cable connection housing accommodates at least two insulating bodies. The insulating bodies are designed to accommodate in each case one high-power contact. The insulating bodies advantageously have fastening means, for example threads, protrusions for bayonet catches, springs, grooves, or similar means for fixing the insulating body in the cable connection housing. The insulating bodies are furthermore provided in the inside of the cable connection housing with a profiling or a fluting, for example with a corrugated profile or radial springs and/or grooves at the periphery. The air gaps and creepage distances in the inside of the cable connection housing are advantageously increased as a result. The longitudinal axes of the high-power contacts are arranged fundamentally in a plane and arranged so that they are offset relative to one another. The high-power contacts are furthermore connected electrically conductively to one another by means of an electrically conductive busbar, wherein, in order to reduce the physical space requirement, the at least two high-power contacts are provided with a recess into which the electrically conductive busbar fits at least partially. The busbar can thus also be one which is provided with openings into which the at least two high-power contacts are inserted with the in each case at least one recess. Connection using known shaft-and-hub connections can, for example, be envisaged here. Particularly preferred is an embodiment of the cable connection housing which receives more than two high-power contacts, and in particular a cable connection housing receives three high-power contacts. The high-power contact is preferably at least partially configured as a cylindrical profile. At least one region of the high-power contact to be connected is particularly preferably formed as a cylindrical solid profile. The use of other geometrical profiles is known to a person skilled in the art and can advantageously be used. The cylindrical high-power contact preferably has a fundamentally plane region, which is provided for connection to the electrically conductive busbar, in a region of the circumferential surface. Material can be removed by machining, for example, from this plane region, in particular by milling. A groove could furthermore also be incorporated into the high-power contact by machining. The groove should here ideally reach a depth which is sufficient to at least partially accommodate the electrically conductive busbar. By virtue of the connection of the busbar to the high-power contacts, either by a plane bearing surface or an incorporated groove, physical space can firstly be saved. The high-power contacts are furthermore prevented from twisting about their longitudinal axis inside the insulating bodies accommodating the high-power contact. Manufacturing processes that use forming to produce an approximately plane surface on the high-power contact are also in principle conceivable.

In a preferred embodiment, the busbar is connected in form-fitting fashion to the high-power contacts. A busbar can, for example, have a plurality of first openings of the same type, into which the high-power contacts are pushed. These openings are configured fundamentally as cylindrical openings but with integrally formed protrusions which are brought into engagement with the recesses of the correlating high-power contacts. In order to connect the busbar to the high-power contacts, for example, a securing pin, a split pin, or a comparable securing element can then be pushed through the respective high-power contacts. A second opening, which runs fundamentally approximately orthogonally to a first opening and can be brought to coincide with a corresponding opening in the respective high-power contacts, can likewise be provided in the busbar. A securing element can be inserted through this second opening in order to ensure securing in a form-fitting fashion. The second opening can here be configured in the busbar both as a through opening and a blind hole.

In a particularly preferred embodiment, the busbar is connected in force-fitting fashion to the high-power contacts. For this purpose, the busbar bears, for example, on the recesses of the high-power contacts. Different force-fitting securing elements can be used as the securing element, for example wedges, screws, grub screws, threaded bolts, or rivets. In one embodiment, the busbar has at least one through opening, through which at least one securing element with an external thread is passed, per high-power contact, wherein the securing element is connected to an internal thread in the high-power contact. Screws are preferably inserted through the through openings in the busbar and screwed into a threaded opening in a corresponding high-power contact. The threaded opening can be a blind hole. It can likewise be a through opening with a thread.

In an expedient embodiment, the at least two high-power contacts are arranged opposite each other in the cable connection housing. Because the high-power contacts are connected in the cable connection housing, the high-power contacts can be contacted with one another. The busbar ensures reliable contacting of the at least two high-power contacts. An embodiment with at least three high-power contacts which can be connected electrically conductively by the busbar in the cable connection housing is particularly preferred. At least one high-power contact and the at least two remaining high-power contacts are here situated opposite each other. The busbar is here connected to the high-power contacts in parallel to a plane formed by the longitudinal axes of the high-power contacts. In an embodiment, the longitudinal axes of the high-power contacts are situated fundamentally parallel to one another. In this embodiment, the busbar is oriented parallel to the plane formed by the longitudinal axes of the high-power contacts and at least fundamentally orthogonally to the longitudinal axes of the high-power contacts.

In an advantageous embodiment, the busbar has a vertical central plane which is pierced by each of the at least two high-power contacts at least partially. By virtue of this embodiment, it is ensured that the busbar can apply a sufficient bearing surface or contact surface to the high-power contacts. A further advantage consists, for example in the case of use of at least three high-power contacts, in, for example, the longitudinal axes of the high-power contacts situated opposite one another being positioned in parallel in a common horizontal plane, offset relative to one another. A particularly space-saving structure is achieved as a result because the high-power contacts do not abut a retaining element or a busbar and instead are guided past the busbar or through the busbar. Because it is fundamentally a matter of transmitting voltages and currents, the high-power contacts can also here be positioned closely next to one another.

A logical embodiment accordingly provides to connect the busbar at least largely flush with the front faces of the at least two high-power contacts. According to the abovementioned embodiment, this means that the high-power contacts are guided beyond the central plane of the busbar as far as the corresponding edge of the busbar. Secure contacting of the busbar with the at least two high-power contacts is effected as a result.

An embodiment expediently provides that the recesses of the at least two high-power contacts lie approximately in a plane such that the busbar is fastened so that it lies on top of the recesses. Both the twisting of the high-power contacts and axial displacement in the direction of the longitudinal axis of the high-power contacts is thus prevented. The cable connection housing and the insulating bodies fastened thereon here fundamentally absorb the forces acting in the longitudinal direction of the high-power contacts. By virtue of the busbar, the high-power contacts are furthermore both secured in the longitudinal direction and secured against twisting about the longitudinal axis.

A skillful embodiment consequently results, the high-power contacts project from a housing wall of the high-power plug connector into an interior of the cable connection housing, wherein the high-power contacts are positioned in self-supporting fashion in the interior and are locked by the busbar. The insulating bodies are configured in such a way that they are connected fundamentally detachably to the cable connection housing. The insulating bodies are ideally mounted to the cable connection housing by screw connections. The insulating bodies are skillfully guided through a through opening and fixed to the latter in the cable connection housing. A high-power plug connector is here configured in such a way that it can be fixed detachably to the cable connection housing. The high-power plug connector is here ideally equipped with an independent housing which can fitted in form-fitting fashion into the cable connection housing and can be fastened detachably to the cable connection housing by securing elements, for example screws. By virtue of this design, all the forces occurring in the cable connection housing can be absorbed and by the high-power plug connector and the cable connection housing itself such that it is possible to dispense with any further retaining elements for the busbar inside the cable connection housing. Insulating bodies are here particularly advantageously configured with an abovementioned profiling, for example with fundamentally corrugated recesses, transversely to the longitudinal axis. The self-supporting insulating bodies, together with the said profiling, have an excellent effect on the air gaps and creepage distances which need to be observed.

An embodiment which is particularly convenient for maintenance here correspondingly provides to orient the securing elements orthogonally to the central plane of the busbar. The cable connection housing of the high-power plug connector is provided with a housing cover for sealing off, ideally in airtight and watertight fashion, the interior of the cable connection housing. If the housing cover is removed, the securing elements (ideally screws), facing from the housing cover in the direction of the base of the cable connection housing, can be reached simply by maintenance staff for repair or maintenance purposes. It should be mentioned here that the housing cover of the cable connection housing expediently faces the ground, whilst the base of the cable connection housing is attached to the outside, underneath the floor, of a vehicle, for example a power car, or a transportation element coupled to it, for example a railcar, which can be moved by a vehicle. It is thus simple for the maintenance or repair staff to gain access to the interior of the cable connection housing, in particular to the high-power contacts and/or the busbar.

BRIEF DESCRIPTION OF THE DRAWINGS

An exemplary embodiment of the invention is illustrated in the drawings and is explained in detail below.

FIG. 4 shows a cross-section along a busbar of the high-power plug connection system.

DETAILED DESCRIPTION

The drawings contain partially simplified schematic illustrations. Identical reference symbols are partly used for the same but possibly not identical elements. Different views of the same elements could be to a different scale.

Specifications of directions such as, for example, "left", "right", "above", and "below" are to be understood with reference to the respective drawing and can vary in the individual illustrations with respect to the object illustrated.

Figure 1:
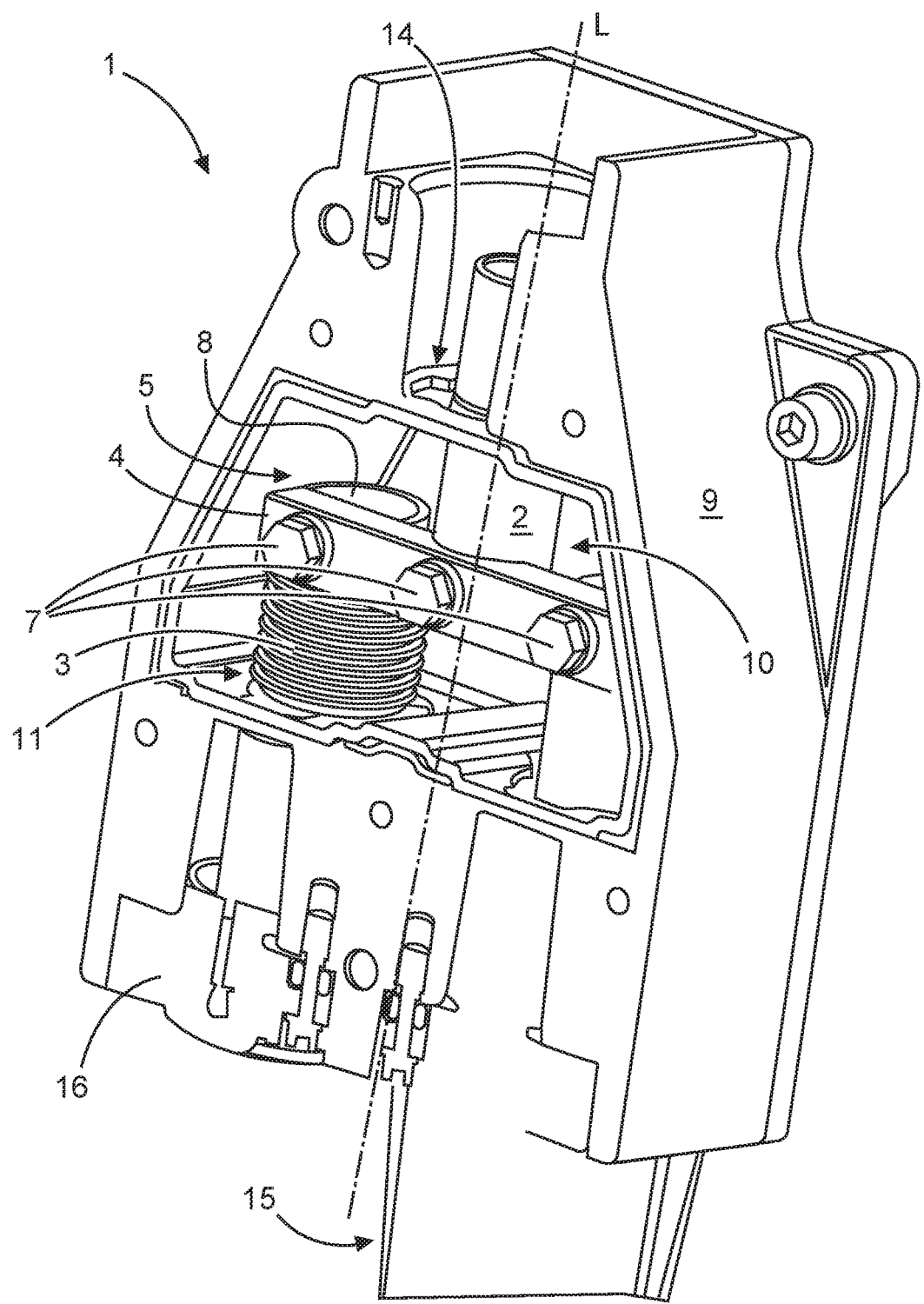
FIG. 1 shows a partial section of a perspective illustration of a high-power plug connection system.

FIG. 1 shows a perspective illustration of a high-power plug connection system with a horizontal section along a line parallel to the longitudinal axis of a cable connection housing 1. The embodiment illustrated has three high-power contacts 2. A high-power contact 2 is here positioned opposite two high-power contacts 2 of the same structure. Two high-power contacts 2 are illustrated without an insulating body 3. The insulating body 3 accommodates the corresponding high-power contact 2 within it. The high-power contacts 2 are connected to one another by means of an electrically conductive busbar 4. For this purpose, the high-power contacts 2 and the associated insulating bodies 3 have recesses 5. The busbar 5 has corresponding through openings 6. The securing elements 7 illustrated are guided through these through openings 6 and connected to the corresponding high-power contacts 2. In the design illustrated, the securing elements 7 are screws with a hexagonal screw head. The high-power contacts 2 have through openings 6, which are provided with an internal thread, for screwing the busbar 4 and the high-power contact 2. Instead of a thread in the through openings 6, a nut or comparable threaded socket can follow on the opposite side of the busbar 4. Alternatively, the high-power contacts 2 are each configured with a blind hole which is provided with an internal thread. Other connection options, in particular hub-and-shaft connections, are known to a person skilled in the art and can be used as an alternative to the securing elements 7 illustrated. In order to establish a secure and at least sufficient electrical connection, the high-power contacts 2 are aligned at least partially flush with that edge of the busbar 4 which is situated opposite the housing perforation 14 of the corresponding high-power contact 2. The cable connection housing 1 has a housing wall 9. This peripheral housing wall 9 forms an interior 10.

The insulating body 3 illustrated has a profiling 11, which is illustrated by way of example, at the from a busbar 4 to a housing wall 9 of the cable connection housing 1. The profiling 11 simply and advantageously increases the air gaps and creepage distances from the connection region of the busbar 4 and the high-power contact 2 illustrated therein. It can furthermore be seen that both the insulating body 3 and the high-power contact 2 situated therein each have a recess 5. This recess 5 can be formed, for example, by means of machining production processes. The insulating bodies 3 have a particularly clever design. They are provided with fastening elements 12 in addition to the profiling 11. The fastening elements 12 are integrally formed on the insulating body 3 as fundamentally plane, partly circular protrusions. The housing perforations 14, belonging to the insulating bodies 3, in the housing wall 9 of the cable connection housing 1 have recesses which correspond at least to the dimensions of the fastening elements 12 of the insulating bodies 3. The fastening elements 12 and the recesses are here positioned in the housing perforations 14 in such a way that the fastening elements 12 have a securing effect against axial displacement in the direction of the longitudinal axis L of the respective high-power contact 2 as soon as the high-power contact 2 with the associated insulating body 3 and with the busbar 4 is fixed detachably by the securing element 7. In other words, the fastening element 12 of the insulating body can be connected to the housing wall 9 in a comparable fashion to a bayonet catch.

Figure 2:
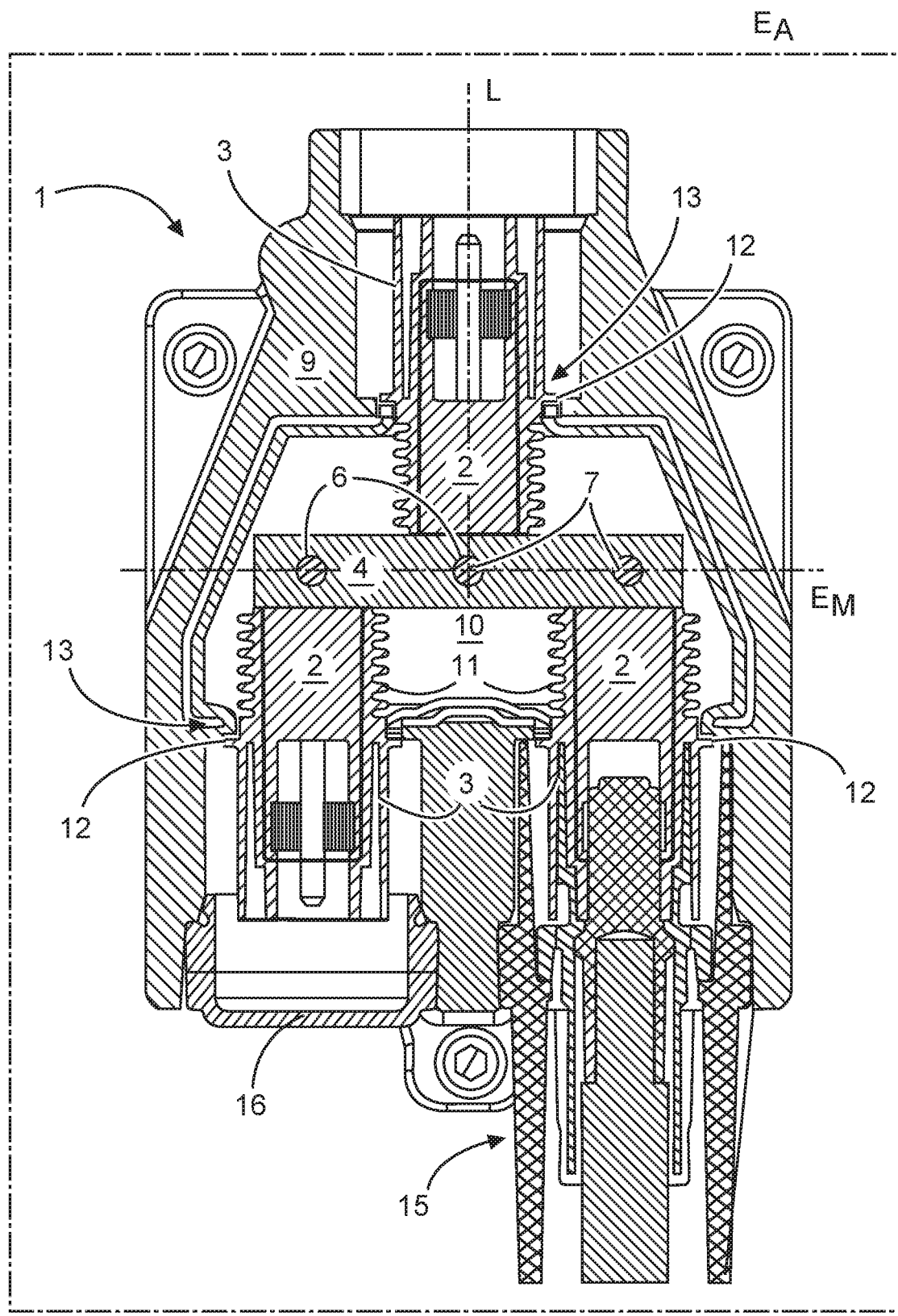
FIG. 2 shows a horizontal section along a longitudinal axis of the high-power plug connection system.

The embodiment of a high-power plug connection system with a cable connection housing 1 is shown in FIG. 2 in an illustration in section comparable to the illustration in section of FIG. 1 but in a direct view from above. FIG. 1 and FIG. 2 show that the housing wall 9 has through openings for the connection of high-power plug connectors 15 to corresponding high-power contacts 2. However, if a cable connection housing 1 receives just two high-power contacts 2, a closure cap 2 can be inserted into the said through openings of the cable connection housing 1 in order both to secure the insulating body 3 of the corresponding high-power contact 2 and to protect the cable connection housing 1 against the ingress of, for example, water, oil, dust, or similar undesired foreign substances.

Figure 3:
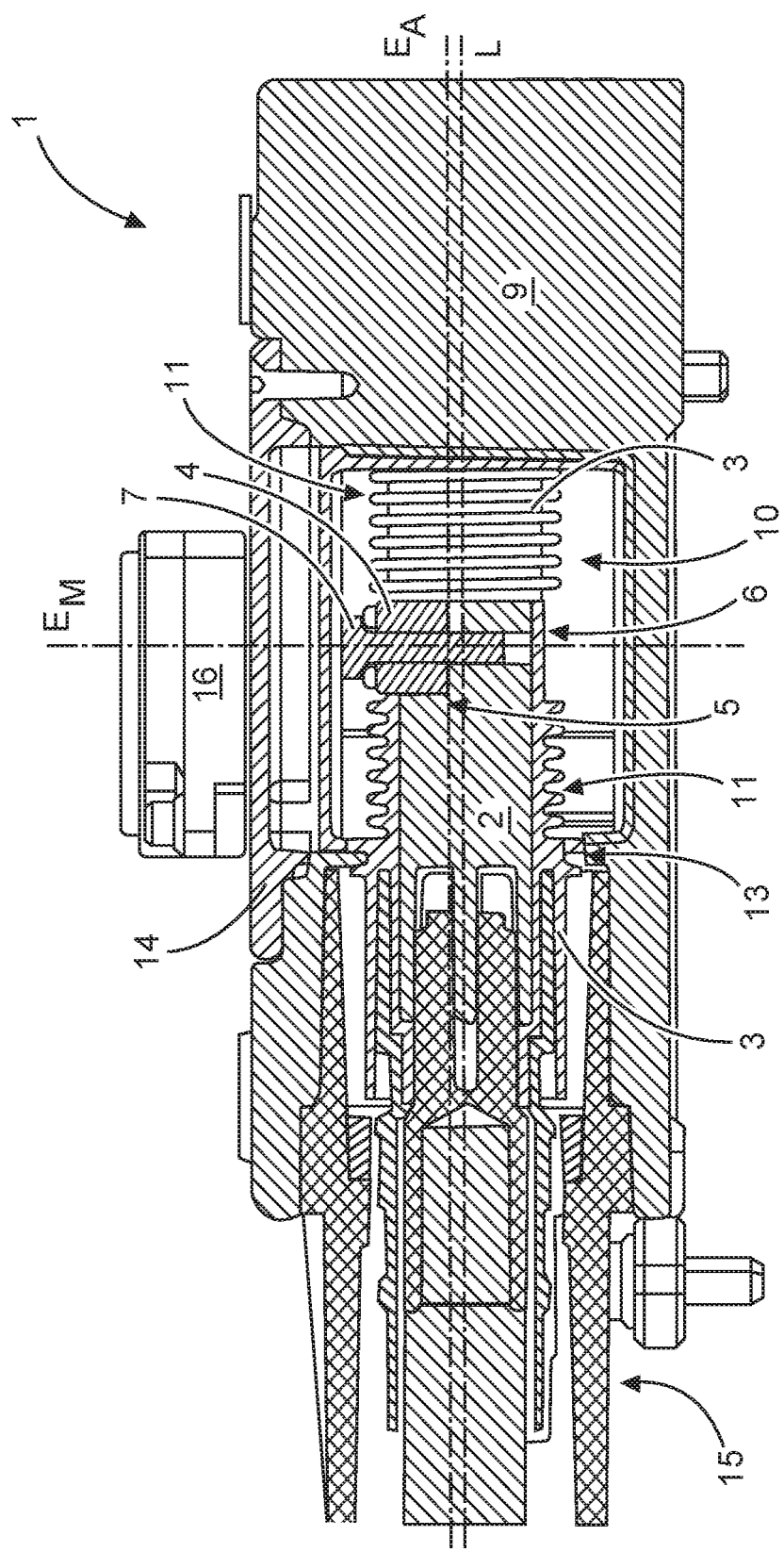
FIG. 3 shows a vertical section along a longitudinal axis of the high-power plug connection system.

FIG. 3 shows the embodiment of the high-power plug connection system with the cable connection housing 1 in a vertical section along the longitudinal axis L of a high-power contact 2. The small physical dimensions of the interior 10 are particularly clear in this illustration. Furthermore, access for the purpose of mounting and maintaining the cable connection housing 1 via a housing cover 14 is clear. The housing cover 14 is here formed in such a way that a closure cap 16 can be connected to the housing cover 14 if the closure cap 16 is not required. Also clearly visible in this illustration in section is the connection of the busbar 4 to the high-power contacts 2. The high-power contacts 2 have a recess 5. The recesses 5 of the high-power contacts 2 lie in a horizontal plane $E_A$. The busbar 4 can be applied to the recesses 5 in such a way that the busbar 4 ends flush with the respective high-power contacts 2 at their front side 8. As a result, the high-power contacts 2 project beyond the central plane $E_M$ of the busbar. By virtue of this embodiment, a small structural size of the cable connection housing 1 compared with the prior art is achieved.

A vertical cross-section of a high-power plug connection system, consisting of the cable connection housing 1 and components in the interior 10, is illustrated in FIG. 4. The arrangement of the high-power contacts 2 and the positioning of the recesses in the plane $E_A$ are particularly clear here. Because the section runs along the central plane $E_M$ of the busbar 4, the connections of the busbar 4 to the high-power contacts 2 by the securing elements 7 can be clearly seen. The securing elements 7 are here oriented along its longitudinal axis parallel to the central plane $E_M$ of the busbar 4, orthogonally to the plane $E_A$. Simple access for maintenance can thus be effected after the housing cover 14 has been removed. Also clearly visible are the fastening elements 12 of the two insulating bodies 3 of the outer high-power contacts 2 which are configured as partly circular, integrally formed parts on the respective insulating body 3. After the busbar 4 has been detached and removed from the high-power contacts 2 by twisting the insulating body 3, these fastening elements 12 can be brought into alignment with coinciding recesses in the housing perforations 13. Then, as soon as the fastening elements 12 and the recesses in the housing perforations 13 coincide, the insulating bodies 3 with the high-power contacts 2 can be removed from the cable connection housing 1 and/or be inserted and/or be replaced.

Even though different aspects or features of the invention are shown in the drawings in each case in combination, unless otherwise stated, it is clear to a person skilled in the art that the combinations illustrated and discussed are not the only ones possible. In particular, corresponding units or bundles of features from different exemplary embodiments can be interchanged.

The articles "a" and "an" as used in this application should generally be construed to mean "one or more" unless specified otherwise or clear from context to be directed to a singular form.

LIST OF REFERENCE SYMBOLS 1 cable connection housing
2 high-power contact 3 insulating body
4 busbar
5 recess
6 through opening
7 securing element
8 front face
9 side wall
10 interior
11 profiling
12 fastening element
13 housing perforation
14 housing cover
15 high-power plug connector
16 closure cap
L longitudinal axis
$E_A$ plane
$E_M$ central plane

The invention claimed is:

1. A high-power plug connection system, comprising:
a cable connection housing (1) for connecting at least two electrical high-power plug connectors (15) for transmitting and/or distributing high electrical current strengths and/or high electrical voltages,
at least two insulating bodies (3) for receiving at least one of at least two high-power contacts (2) each, and
an electrically conductive busbar (4),
wherein longitudinal axes (L) of the high-power contacts (2) are arranged in a plane and are offset relative to one another, and
wherein the at least two high-power contacts (2) are connected electrically conductively to one another by the electrically conductive busbar (4),
wherein the at least two high-power contacts (2) are provided with at least one recess (5) into which the electrically conductive busbar (4) fits at least partially.

2. The high-power plug connection system as claimed in claim 1,
wherein the busbar (4) is connected in form-fitting fashion to the high-power contacts (2).

3. The high-power plug connection system as claimed in claim 1,
wherein the busbar (4) is connected in force-fitting fashion to the high-power contacts (2).

4. The high-power plug connection system as claimed in claim 1,
wherein the busbar (4) has a through opening (6), through which a securing element (7) with an external thread is passed, per high-power contact (2),
wherein the securing element (7) is connected to an internal thread in the high-power contact (2).

5. The high-power plug connection system as claimed in claim 1,
wherein at least one high-power contact (2) is arranged in the cable connection housing (1) so that it is situated opposite the remaining at least one high-power contact (2).

6. The high-power plug connection system as claimed in claim 1,
wherein the busbar (4) has a vertical central plane ($E_M$) which is pierced by each high-power contact (2) at least partially.

7. The high-power plug connection system as claimed in claim 1,
wherein the busbar is connected at least largely flush with front faces (8) of the at least two high-power contacts (2).

8. The high-power plug connection system as claimed in claim 1,
wherein the recesses (5) of the at least two high-power contacts (2) lie approximately in a plane ($E_A$) such that the busbar (4) is fastened so that it lies on top of the recesses (5) and thus prevents both radial twisting and axial displacement in the direction of the longitudinal axes (L) of the high-power contacts (2).

9. The high-power plug connection system as claimed in claim 1,
wherein the high-power contacts (2) project from a housing wall (9) of the cable connection housing (1) into an interior (10) of the cable connection housing (1), in associated insulating bodies (3),
wherein the high-power contacts (2) are positioned in self-supporting fashion in the interior (10) and are locked by the busbar (4).

10. The high-power plug connection system as claimed in claim 4,
wherein the securing element (7) is oriented parallel to a central plane ($E_M$) of the busbar (4).

* * * * *